(No Model.) 3 Sheets—Sheet 1.
C. C. HILL.
MACHINERY FOR MANUFACTURING BICYCLE SPOKES, WIRE, OR OTHER LIKE ARTICLES.
No. 562,825. Patented June 30, 1896.
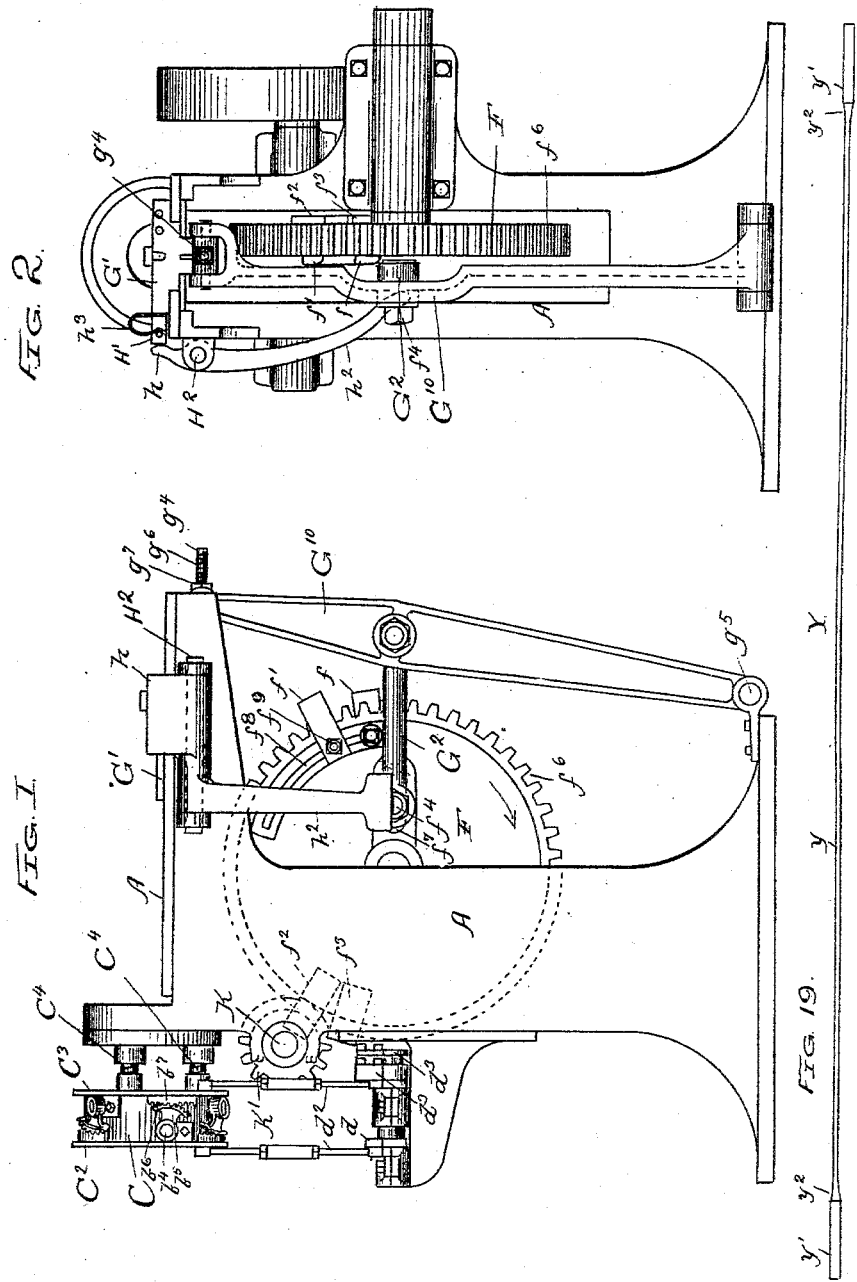
WITNESSES:
Sew. E. Curtis
H. W. Munday
INVENTOR:
CHRISTIAN C. HILL.
By Munday, Evarts, & Adcock
HIS ATTORNEYS

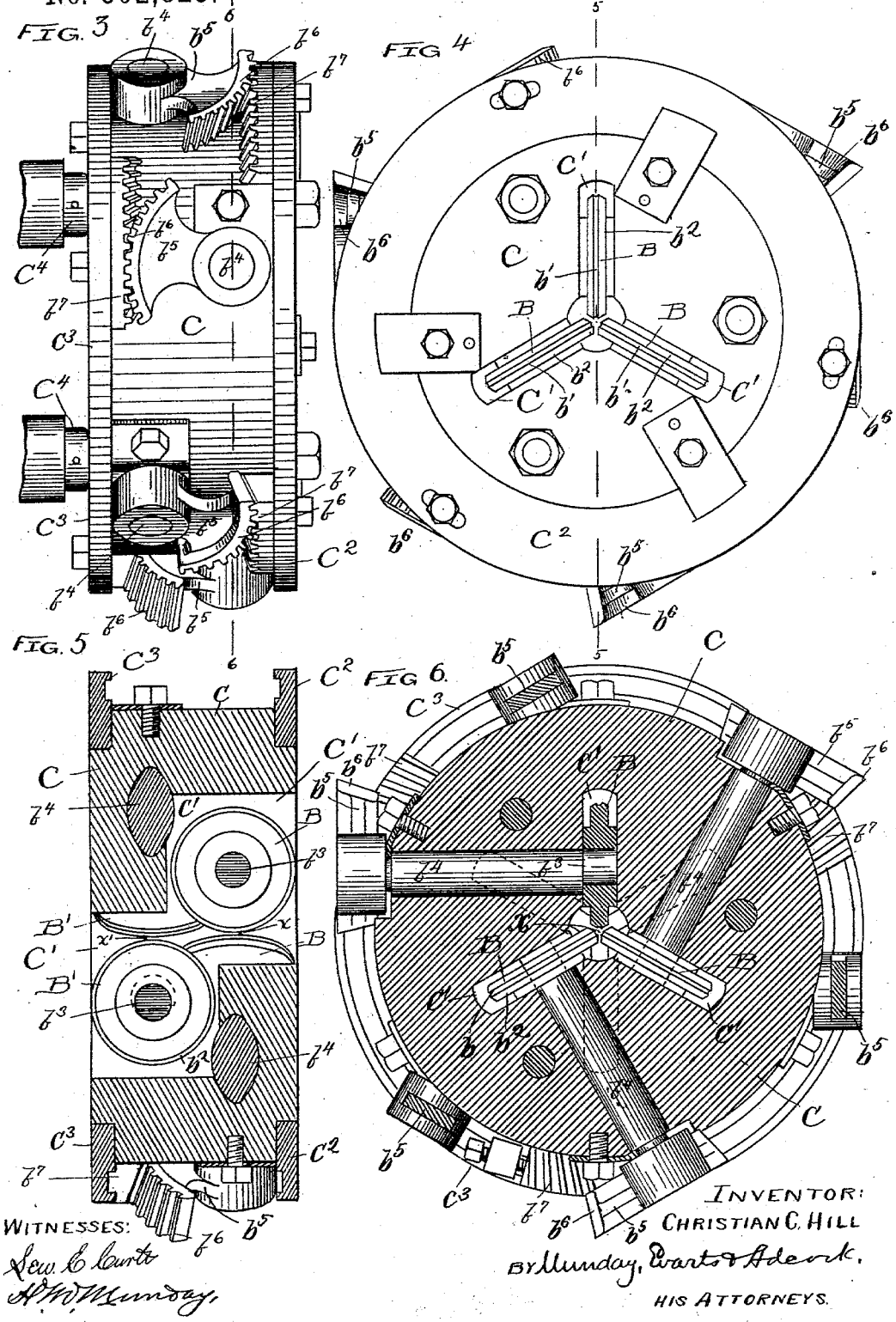

(No Model.)  3 Sheets—Sheet 3.
C. C. HILL.
MACHINERY FOR MANUFACTURING BICYCLE SPOKES, WIRE, OR OTHER LIKE ARTICLES.
No. 562,825.  Patented June 30, 1896.
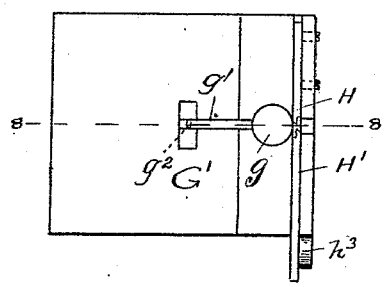
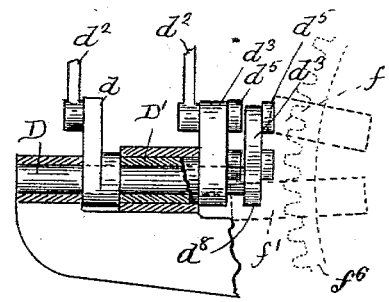
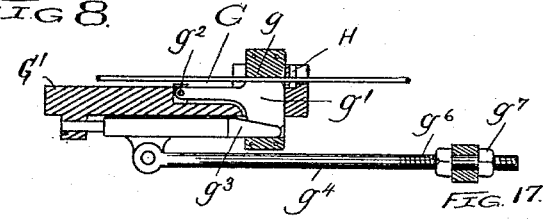
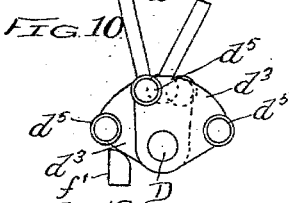
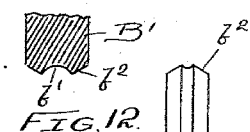
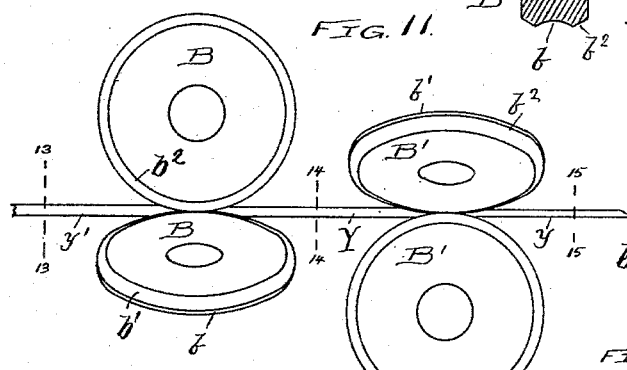
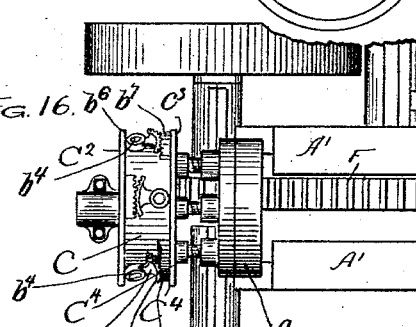
WITNESSES:
Sew. E. Curtis
H. W. Munday
INVENTOR:
CHRISTIAN C. HILL.
By Munday, Evarts & Adcock
HIS ATTORNEYS.

UNITED STATES PATENT OFFICE.

CHRISTIAN C. HILL, OF CHICAGO, ILLINOIS, ASSIGNOR TO THE EXCELSIOR NEEDLE COMPANY, OF TORRINGTON, CONNECTICUT.

MACHINERY FOR MANUFACTURING BICYCLE-SPOKES, WIRE, OR OTHER LIKE ARTICLES.

SPECIFICATION forming part of Letters Patent No. 562,825, dated June 30, 1896.

Application filed January 10, 1895. Serial No. 534,453. (No model.)

*To all whom it may concern:*

Be it known that I, CHRISTIAN C. HILL, a citizen of the United States, residing in Chicago, in the county of Cook and State of Illinois, have invented a new and useful Improvement in Machinery for Manufacturing Bicycle-Spokes, Wire, or other Like Articles, of which the following is a specification.

The present invention is made for the purpose of reducing wire, metal rods, or similar articles, such, for example, as bicycle-spokes, and the object of the present invention is to reduce the wire automatically for a greater or less length as the wire is drawn through between roller-dies and then to open the roller-dies more or less to allow the wire to pass through without reducing it or to lessen the amount of reduction.

In carrying out this invention three or more rollers are set together in a group to form a roller-die, the opening between the edges of which rolls may be varied to expand or contract such opening by a movement given to the rolls, and two or more sets or groups of rolls are employed, the rolls in one set coming on the line of the spaces between the rolls in the other set.

In carrying out this invention a shaft is made use of for each roll, and at the inner end of the shaft is an eccentric stud or journal for the roll, so that by partially turning the shaft the roll will be moved outwardly or inwardly, and at the outer end of each shaft is an arm that is moved automatically in effecting the aforesaid expansion or contraction of the roller-dies. I find it convenient to pass the shafts of the die-rolls into a circular head having a central opening through which the wire to be acted upon is drawn, and the rolls are equidistant in planes that are radial to the wire, and at the outer ends of these shafts arms are provided with segmental gears, and these are acted upon by rings having gear sections that engage the segmental gears, and the rings are partially rotated by automatic mechanism as the roller-dies are opened or closed. By this means wire can be acted upon to reduce the diameter of the same and leave the ends of the wire of the spokes of their original size, so as to be adapted to receive screw-threads or be otherwise formed for connecting the ends of the spokes in the manufacture of wheels.

In the drawings, Figure 1 is a side elevation; Fig. 2, an end elevation. Fig. 3 is an enlarged side elevation of the head in which the roller-dies are mounted. Fig. 4 is a face or end view of the same. Fig. 5 is a section on line 5 5 of Fig. 4. Fig. 6 is a section on line 6 6 of Fig. 3. Fig. 7 is a detail plan view of the gripper and cross-head for drawing the wire through the die, showing also the knives for cutting the wire into lengths or spokes. Fig. 8 is a vertical section on line 8 8 of Fig. 7. Fig. 9 is a sectional view of a rock-shaft and rocking sleeve hereinafter to be described. Fig. 10 is a detail view of parts hereinafter to be described. Fig. 11 is a detail perspective view of the roller-dies. Fig. 12 is an end or face view of one of the revolving sectional or roller dies. Figs. 13, 14, and 15 are sections on lines 13 13, 14 14, and 15 15 of Fig. 11, showing the stock before being operated upon by either die, after being operated upon by the first die, and as it issues from the last die, respectively. Fig. 16 is a plan view of the machine. Figs. 17 and 18 are enlarged detail sectional views of the die-rollers. Fig. 19 shows the spoke or product.

In the drawings, A represents the frame of the machine, the same being of any suitable construction. The particular machine illustrated in the drawings is one designed to do the special work of making bicycle-spokes, and is furnished with but two roller-dies. I wish it to be understood, however, that the number of these dies may be varied as required for different work. For each roller-die any suitable number of revolving sections or rollers may be employed, but I prefer to employ three, as shown in the drawings.

B B B and B' B' B' are the two sets of revolving sectional or roller dies, the individual sections or rollers being mounted to revolve and adapted to be moved to and from each other in a suitable head or support C, which is provided with suitable recesses C' to receive said rollers B and B'. Each of the die-rollers B B' is provided with a peripheral segmental die-groove $b$ or $b'$, the die-rollers B of the first die having a somewhat flattened but curved die-groove $b$, as clearly shown in Fig. 17, while the die-groove $b'$ of the second set of die-rollers B′ is circular. The die-rollers have beveled faces $b^2$, in order that the meeting rollers of each die may together form a complete or continuous die-wall surrounding the wire.

Any suitable means for rotatably mounting the rollers B B′ and for moving them to and from each other and for holding them rigidly in position while doing work may be employed; but that which I prefer to use and have specially designed for the purpose is shown in the drawings. It will also be understood that the intervals at which one or more of the dies are closed together for work, or held open to let the stock pass without being acted upon, will be different according to the particular work being done or article being made. The bicycle-spoke Y, made by the particular machine shown in the drawings, has its middle portion $y$ of smaller diameter than its two end portions $y'$ $y'$, the portions of different diameter being connected by tapering or conical shoulders $y^2$; but both the smaller and larger portions and also the intermediate tapering or shoulder portions are circular in cross-section, and therefore in the machine shown in the drawings both dies are operated to close upon the passing stock at the same points in its length, and also to open in like manner; but if it were desired, for example, to roll and draw the stock in part of a round form as produced by the second die B′ and in part of a different shape in cross-section, as, for example, that produced by the first die B, it will be understood that all that is necessary is to open the second die B′ at intervals while the first die B is closed, so that a portion of the passing stock will have the shape of one die and another portion the different shape of another die, and so on for as many dies or pairs of dies as may be required.

The die-rollers B and B′ are each preferably journaled loosely on an eccentric shaft or stud $b^3$, secured to or integral with a rock-shaft $b^4$, journaled in the head C, so that by rocking the shaft $b^4$ the roller-dies B B B or B′ B′ B′ may be moved to or from each other as required to diminish or increase the size of the die-opening $x$ or $x'$. The rock-shafts $b^4$ are preferably actuated by providing each with a crank-arm $b^5$, furnished with a segment-gear $b^6$, that meshes with a segment-gear $b^7$, secured to the rotatable rings $C^2$ $C^3$ on the head C. The rings $C^2$ $C^3$ are preferably actuated or rocked by means of the crank-arms $d$ $d^3$ on the rocking shaft D and rocking sleeve D′ and the connecting-rods $d^2$ $d^2$. The rocking shaft D has on one end the arm $d^8$, having on its end antifriction-rollers $d^5$, and on the arms $d^3$ of the sleeve D′ are also antifriction-rollers $d^5$, and these rollers are acted upon by arms or projections $f$ $f'$ $f^2$ $f^3$ on the cam-wheel F. There are four arms or projections $f$ $f'$ $f^2$ $f^3$ on the wheel F, one for opening and one for closing each of the two sets of roller-dies B B′.

Any suitable means may be combined with my roller-dies for drawing or pulling the wire through the dies, but that which I prefer to use in making spokes or articles of a fixed length is illustrated in the drawings, and consists of a reciprocating gripper G, the same comprising preferably a fixed jaw $g$ and a movable jaw $g'$, both mounted upon a reciprocating cross-head or other movable device G′, by which the wire or stock is drawn through the roller-dies B B′. The movable jaw $g'$ is preferably pivoted at $g^2$ to the cross-head G′, and is operated or closed upon the wire by a sliding wedge $g^3$, to which the rod $g^4$ is connected and by which the cross-head is reciprocated or directly connected with the operating-lever or other moving part, so that the gripper will be automatically opened and closed by the means employed for reciprocating the cross-head. The cross-head G′ reciprocates on suitable guides or ways A′ on the frame of the machine. The cross-head is reciprocated by a lever $G^{10}$, pivoted at $g^5$ to the frame, and connected by a rod $G^2$ to the wrist-pin or crank $f^4$ on the cam-wheel F.

The spokes or other articles are cut to lengths required from the wire by means of a pair of knives or cutters H H′, (see Fig. 16,) mounted on the cross-head G′, the movable knife H′ being actuated or reciprocated by an arm $h$ on a rock-shaft $H^2$, furnished with an arm $h^2$, that engages a cam or projection, or the wrist-pin $f^4$, on the cam-wheel F. The movable knife H′ is returned to its normal position by a spring $h^3$.

K is the driving-shaft. It is provided with a gear K′, that meshes with gear-teeth $f^6$ on the cam-wheel F.

The stroke or travel of the reciprocating gripper-carrying cross-head G′ is equal to the length of the spoke or article being made and serves thus not only to draw the stock through the dies, but to feed the stock in the measured lengths necessary for each spoke. To adapt the machine to make spokes of different lengths the wrist-pin $f^4$ is fixed adjustably to the cam-wheel F, so that the stroke of the lever $G^{10}$ may be varied, this being done by providing the cam-wheel with a slot $f^7$ to receive the wrist-pin; and to properly adjust the cross-head and grippers in relation to the dies as may be necessary to increase or diminish the length of wire projecting through or in advance of the dies the connecting-rod $g^4$ is made adjustable by screw-threads $g^6$ and nuts $g^7$.

The arms or projections $f$ $f'$ $f^2$ $f^3$ are made adjustable on the cam-wheel F by providing said wheel with slots $f^8$, in which said arms are secured by bolts $f^9$, so that the intervals at which each die B or B′ is closed, held closed, and opened may be regulated as desired to vary the length and relative position of the reduced portion $y$ of each spoke.

In order to firmly hold the dies B or B′ closed or in position while doing work, the connecting rods $d^2$ $d^2$, which are pivoted to the arms $d$ $d^3$, are arranged to be thrown past the center by the projections, $ff'$, which close the dies, as illustrated in Figs. 10 and 9.

The knives H H' are so combined and arranged, as shown in the drawings, in relation to the other parts as to sever each spoke from the wire at the middle of the larger portion of the wire, so as to leave a portion $y'$ $y'$ of the larger diameter on each end of every spoke. By changing the relative position of the knives, however, each spoke or article can be severed from the wire at any point desired.

By mounting the die-rollers B B' in recesses or slots in a head or support C, as shown in the drawings, the walls of these recesses serve to hold or aid in holding or maintaining the individual sections or rollers of each complete die truly in its proper position, especially when the dies are closing upon the stock and before their bevel faces $b^2$ come together. The head C is connected to the frame A by adjusting screws $C^4$ so that the dies may be properly alined with the reciprocating gripper or its cross-head, for the purpose of causing the finished product to come out straight instead of curved as it might otherwise do.

In the drawings the devices that open the dies are represented as acting upon all the rolls in each group, but it will be apparent that a similar operation of relieving the pressure of the rolls upon the article under treatment will be effected if only one or two rolls in each pair is opened or closed.

I claim—

1. The combination in a machine for reducing wire, of die-rolls, studs on which they revolve, shafts carrying such studs and eccentric to them, a head supporting such shafts and mechanism for turning and holding such shafts to vary the roller-die opening, substantially as specified.

2. A supporting-head in combination with two sets of shafts in two parallel planes in such head the shafts standing at equal angles to each other in each set and the shafts in one set between the shafts of the other set, each shaft having an eccentric stud, a roller on such stud the rolls of each set forming a die, and means for turning the shafts in each set to adjust the action of the roller-dies, substantially as specified.

3. The combination in a machine for reducing wire, of rolls in radial planes to the wire to be reduced, a shaft for each roll extending out at one side of such roll and having an eccentric stud for the roll, a head for receiving and supporting such shafts, there being a central hole in such head for the passage of the wire and arms upon the outer ends of such shafts and means for moving such arms to turn the shafts and vary the die-openings between the rolls, substantially as specified.

4. The combination in a machine for reducing wire of rolls in radial planes to the wire to be reduced, a shaft for each roll extending out at one side of such roll and having an eccentric stud for the roll, a head for receiving and supporting such shafts, there being a central hole in such head for the passage of the wire, and arms upon the outer ends of such shafts, connections between the arms and for moving the arms simultaneously to adjust the die-rolls, substantially as specified.

5. The combination in a machine for reducing wire, of rolls in radial planes to the wire to be reduced, a shaft for each roll extending out at one side of such roll and having an eccentric stud for the roll, a head for receiving and supporting such shafts, there being a central hole in such head for the passage of the wire, and arms upon the outer ends of such shafts, connections between the arms and for moving the arms simultaneously to adjust the die-rolls, there being two sets of die-rolls and their shafts and arms, the rolls of one set acting on the wire between the lines of reduction by the other set of die-rolls, substantially as specified.

6. The combination with a set of movable die-rollers, of shafts furnished with eccentric studs upon which said rollers are journaled, each of said shafts having a segment-gear arm, and a gear-ring for operating said segment-gear arms, substantially as specified.

7. The combination with a set of movable die-rollers, of shafts furnished with eccentric studs upon which said rollers are journaled, each of said shafts having a segment-gear arm, a gear-ring for operating said segment-gear arms, a rock-shaft provided with an arm, and a connecting-rod connected at one end to said segment-gear and at the other end to the arm of the rock-shaft, said connecting-rod being arranged and adapted to be thrown past the center, substantially as specified.

8. The combination with two sets of movable die-rollers, of a head or support in which they are mounted, two sets of eccentric rock-shafts journaled in said head for moving the rollers to and from each other, each of said rock-shafts being provided with an operating-arm, and two rocking rings mounted on the head for operating the arms of said rock-shafts, substantially as specified.

9. The combination with two sets of movable die-rollers, of a head or support in which they are mounted, two sets of eccentric rock-shafts journaled in said head for moving the rollers to and from each other, each of said rock-shafts being provided with an operating-arm, two rocking rings mounted on the head for operating the arms of said rock-shafts, a rocking shaft having an arm connected by a link with one of said rocking rings, and a rocking sleeve having an arm connected by a link with the other of said rocking rings, substantially as specified.

10. The combination with two sets of movable die-rollers, of a head or support in which they are mounted, two sets of eccentric rock-shafts journaled in said head for moving the rollers to and from each other, each of said rock-shafts being provided with an operating-arm, two rocking rings mounted on the head for operating the arms of said rock-shafts, a rocking shaft having an arm connected by a link with one of said rocking rings, a rocking sleeve having an arm connected by a link with the other of said rocking rings, a cam-wheel furnished with arms or projections for engaging said arms on said rocking shaft and rocking sleeve, substantially as specified.

11. The combination with two sets of movable die-rollers, of a head or support in which they are mounted, two sets of eccentric rock-shafts journaled in said head for moving the rollers to and from each other, each of said rock-shafts being provided with an operating-arm, two rocking rings mounted on the head for operating the arms of said rock-shafts, a rocking shaft having an arm connected by a link with one of said rocking rings, a rocking sleeve having an arm connected by a link with the other of said rocking rings, a cam-wheel furnished with arms or projections for engaging said arms on said rocking shaft and rocking sleeve, the arms on the cam-wheel being adjustably secured thereto, substantially as specified.

12. The combination with two sets of movable die-rollers, of means for independently moving the rollers of each set to and from each other at intervals, and an operating-wheel provided with adjustable arms or projections for adjusting or regulating the intervals at which the rollers of each set are closed or opened, substantially as specified.

Dated January 8, 1895.

CHRISTIAN C. HILL.

Witnesses:
  EDMUND ADCOCK,
  F. S. ODEEL.